Figure 1:
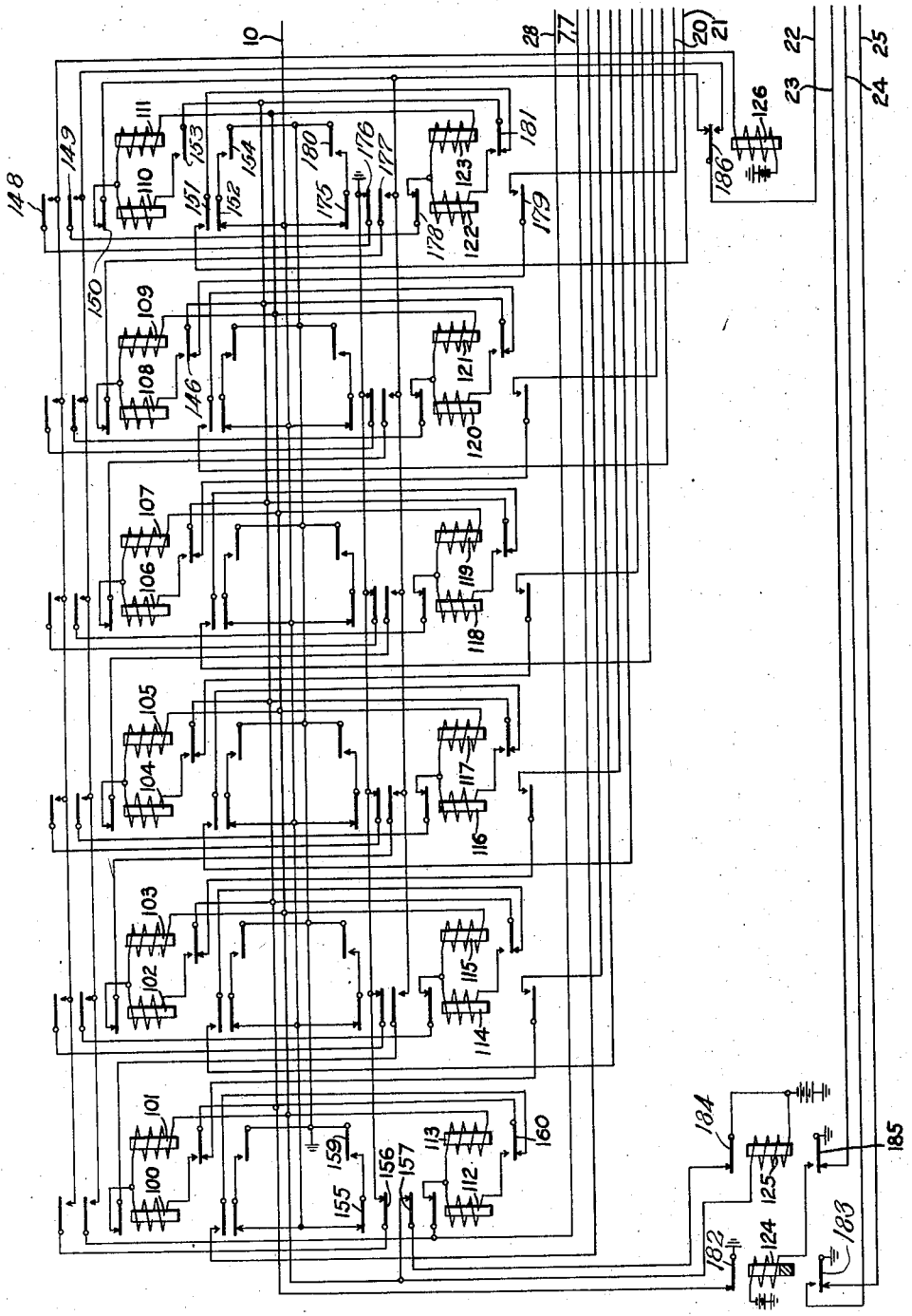

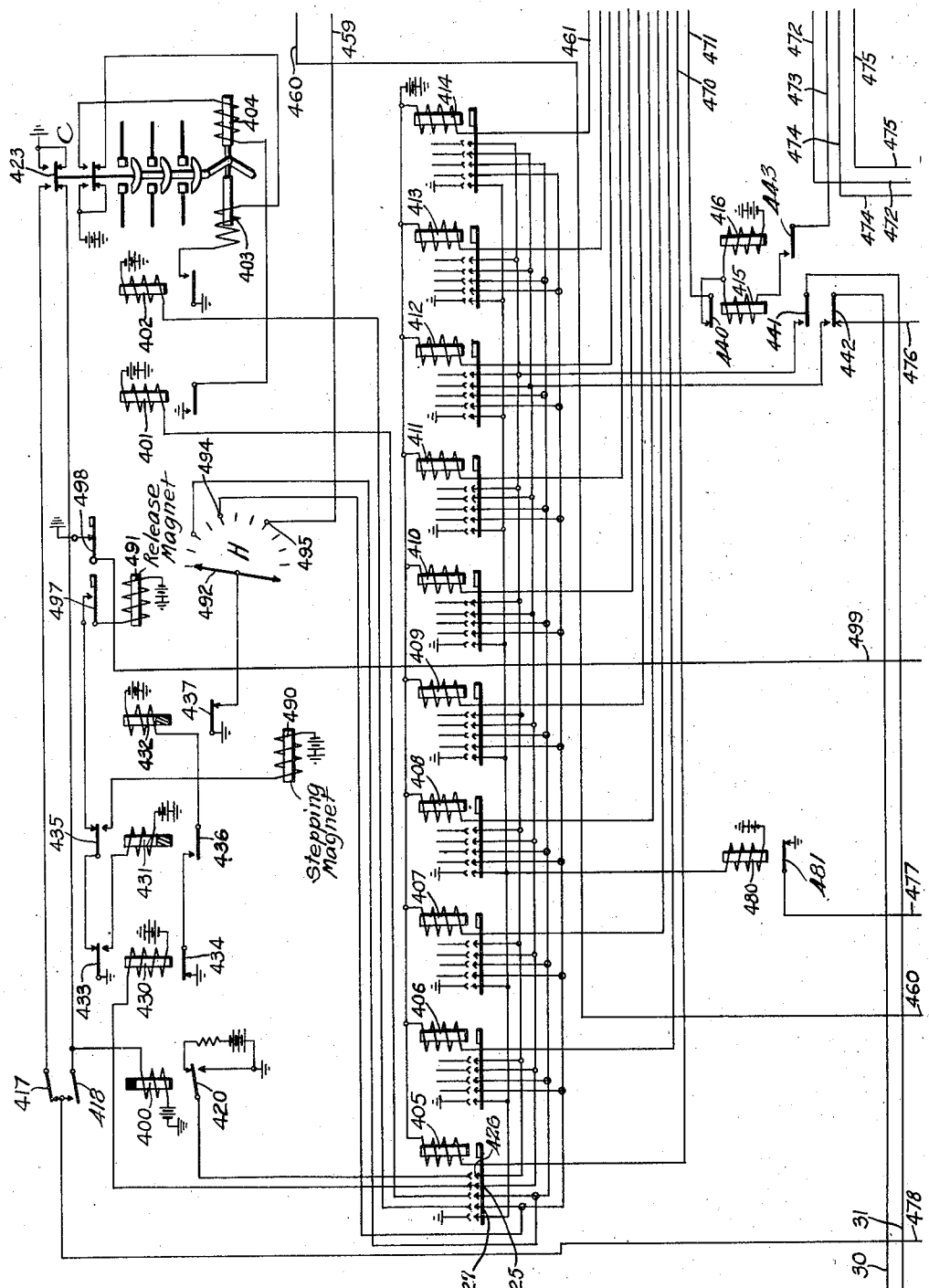

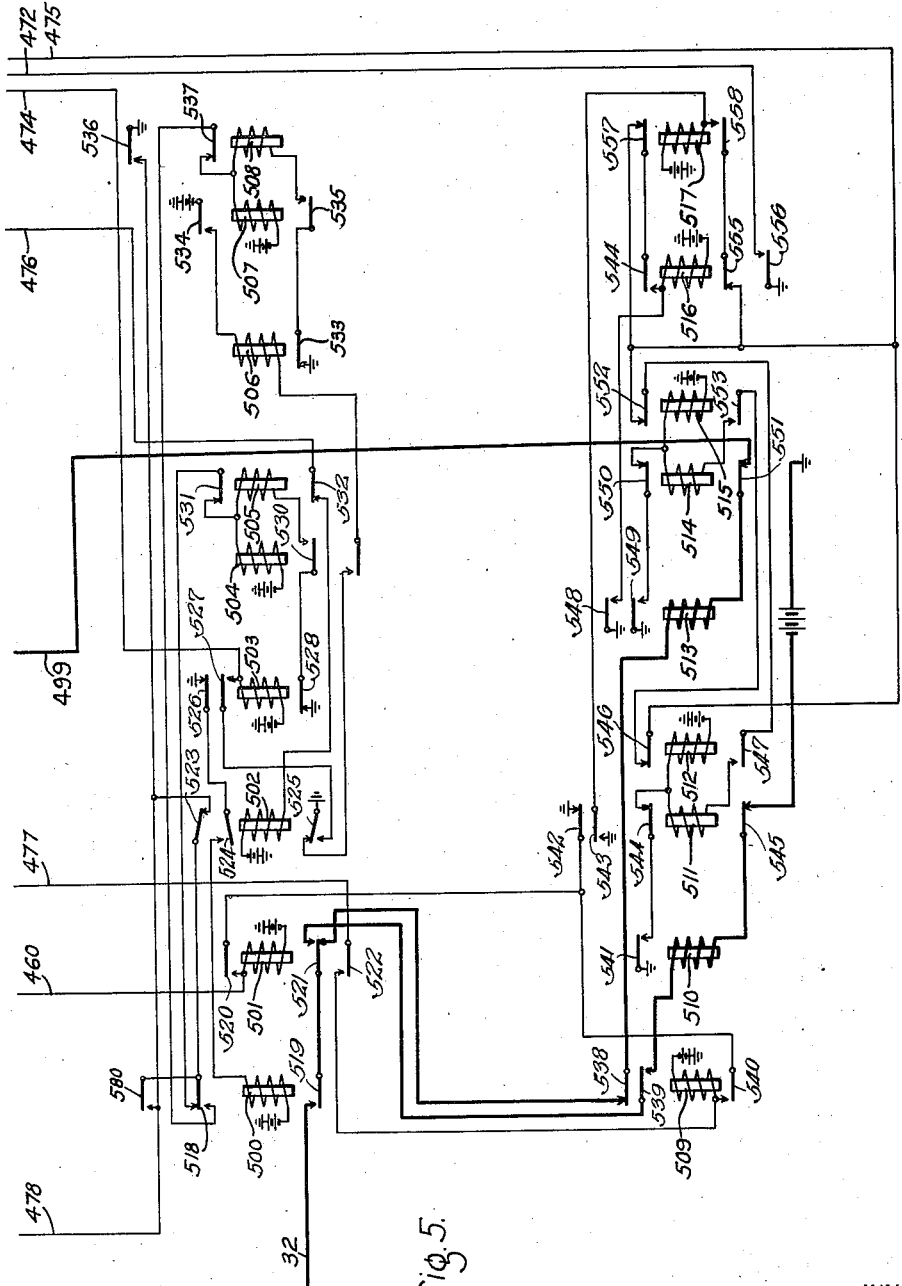

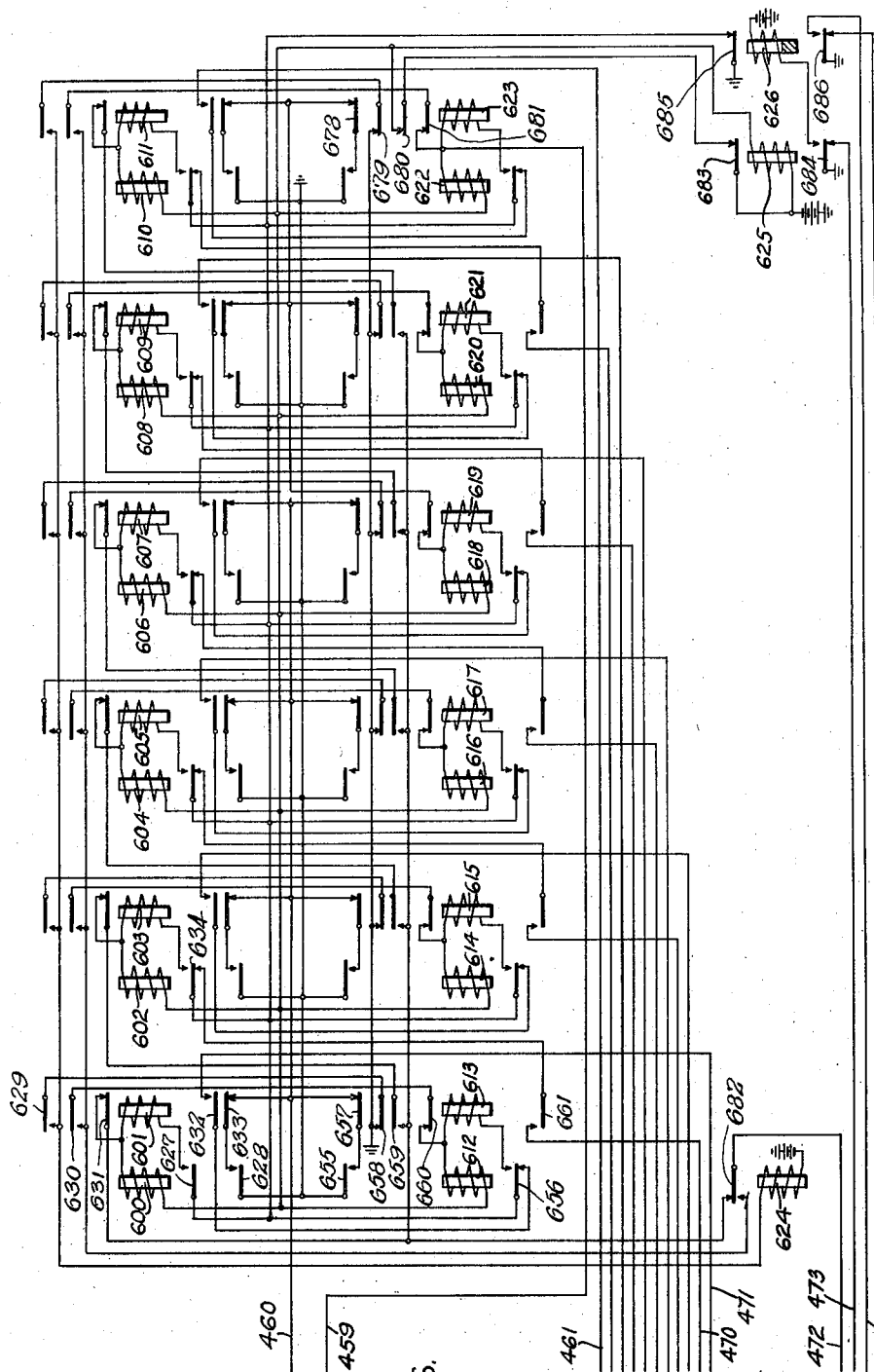

Patented May 28, 1929.

1,714,972

UNITED STATES PATENT OFFICE.

THOMAS U. WHITE, OF PITTSBURGH, AND JOHN E. GARDNER, OF WILKINSBURG, PENNSYLVANIA, ASSIGNORS TO WESTINGHOUSE ELECTRIC & MANUFACTURING COMPANY, A CORPORATION OF PENNSYLVANIA.

SIGNALING SYSTEM.

Application filed December 4, 1924. Serial No. 753,870.

Our invention relates, in general, to electrical control systems, and more particularly to systems for supervising and controlling, from a central point, remotely-disposed electrical apparatus.

One of the objects of our invention is to provide improved selecting circuits consisting wholly of relays for selecting and controlling any one of a number of apparatus units in a remotely-disposed station from a dispatcher's office.

Another object of our invention is to provide improved control circuits whereby the apparatus units in the station may be positively controlled.

Another object of our invention is to provide an improved control circuit which will be unaffected by induced currents.

A still further object of our invention is to provide an improved releasing circuit whereby the selecting apparatus may be restored to normal at both the dispatcher's office and the station at any desired time.

There are other objects of the invention which, together with the foregoing, will be described more fully in the detailed specification which is to follow.

Referring now to the drawings, comprising Figures 1 to 6, inclusive, sufficient apparatus and circuits have been shown, by means of the usual conventional diagrams, to enable our invention to be readily explained and understood. The apparatus and circuits shown in Figs. 1 to 3, inclusive, are those located in the office, while the apparatus and circuits shown in Figs. 4 to 6, inclusive, are those located in the station.

In practicing our invention, we provide a group of counting relays at the office and station, respectively. A group of selecting relays is associated with each group of counting relays. A control key is provided at the dispatcher's office for each apparatus unit that it is desired to control. In addition, two signaling devices are provided at the dispatcher's office for each apparatus unit that it is desired to supervise. A driving circuit is also provided for operating the relays in the counting relay groups in a predetermined sequence.

Briefly, the operation of the system proceeds as follows: When the dispatcher desires to bring about the operation of a circuit interrupter at the substation, he will operate the key associated with this unit and will then operate the starting key. By the latter operation, the driving circuit begins to function to operate the relays in the counting relay chains in a predetermined sequence. By the operation of the counting relays, the selecting relays at the office and station are operated, in a definite sequence, to select various apparatus units and signaling devices.

When the desired unit is selected, the action of the driving circuit is interrupted and the control circuit is prepared for operating the selected unit. The dispatcher will then operate one of the control devices to cause the operation of the unit. The operation of the selected unit completes a signaling circuit for operating the proper signaling device at the dispatcher's office to apprise the dispatcher of the completion of the desired action at the station. When the signaling device has operated, the driving circuit resumes its operation and the apparatus is restored to normal at both the office and station when the last counting relay in the group is operated.

In the event that an apparatus unit is operated at the station, either manually or automatically, the selecting operation of the relay apparatus ensues and the proper signaling devices are actuated in order to apprise the dispatcher of the action at the station.

Referring now more particularly to Fig. 1, relays 100 to 123, inclusive, comprise the counting relay group at the dispatcher's office. Relays 124 to 126, inclusive, control certain actions of the relay selecting apparatus.

Figure 2:
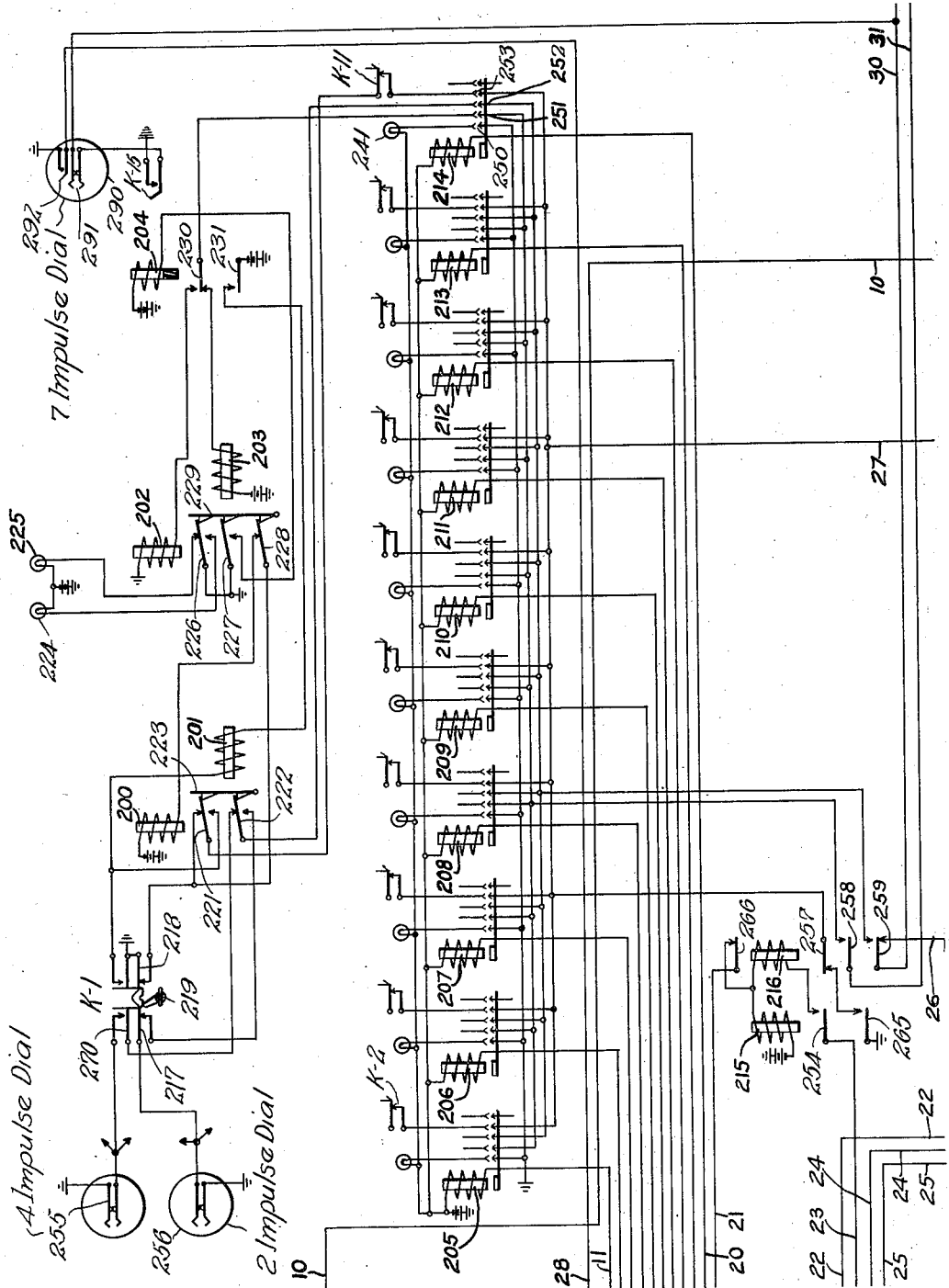
Figure 3:
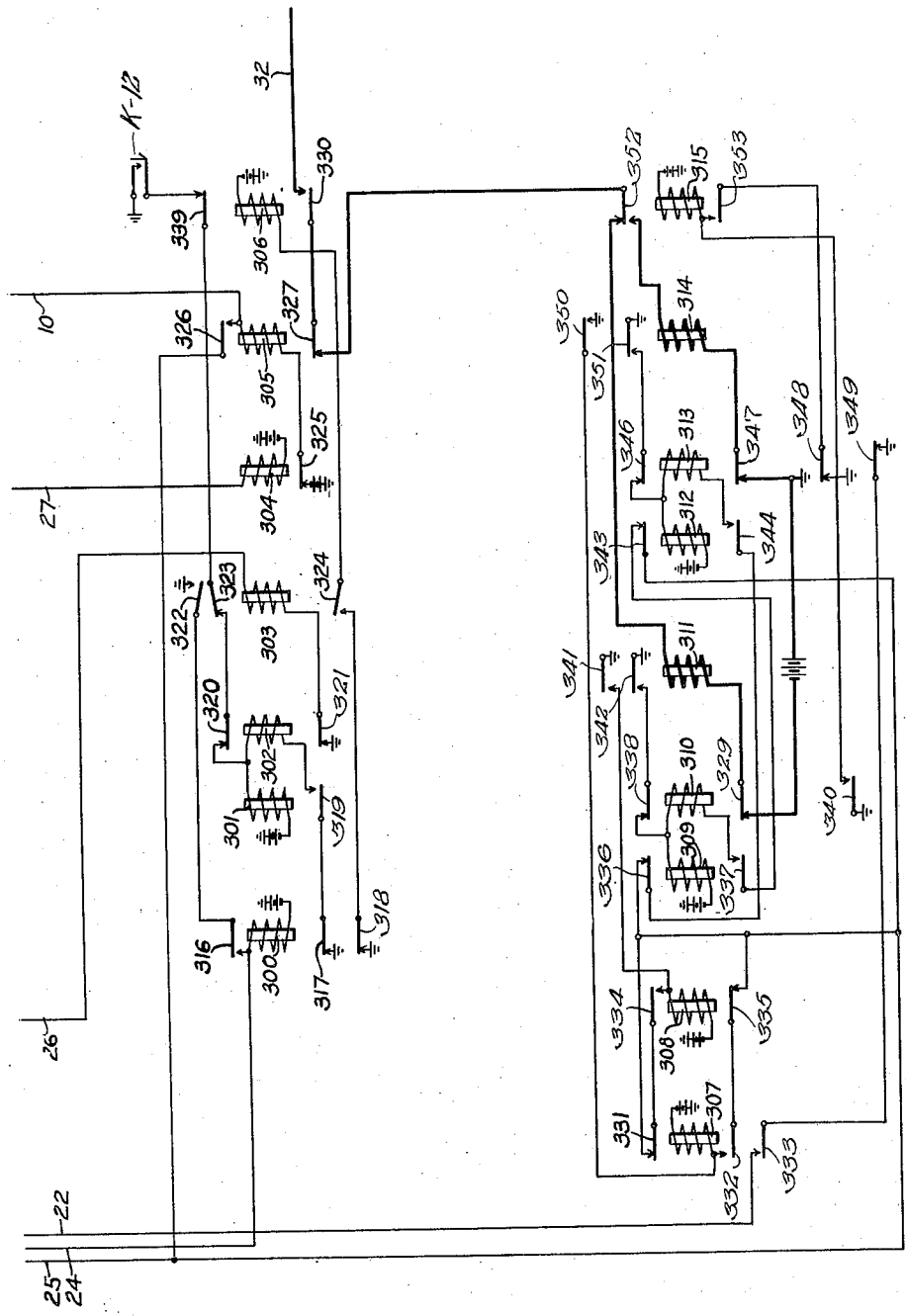

In Fig. 2, relays 205 to 214, inclusive, comprise the group of selecting relays at the office. These relays have been shown as a special type of multi-contact relay, but it will be understood that any type of multi-contact relay may be used. Key K—1 is one of a plurality of control keys and is a special type of locking, double-throw key.

When a handle 219 is turned, springs 217, 218, 220 and 270 assume a position opposite from that shown. When the handle 219 is turned in the opposite direction, the springs are operated to the position shown in the drawings.

Relays 200 to 204, inclusive, are associated with each key, such as K—1. Relays 200 and 201 have their armatures so disposed with respect to each other that the armature 223 of the relay 201, when in retracted position, is adapted to mechanically maintain armatures 221 and 222 of the relay 200 in their operated positions. Relays 202 and 203 are similarly constructed and positioned, and control the operation of signaling devices 224 and 225 that indicate the operation of the corresponding apparatus unit at the substation. Relay 204 is a slow-releasing relay of the usual type. Relays 215 and 216 control certain signaling and control operations in a manner that will appear subsequently.

Devices 255 and 256 are control devices of a special type. These devices are constructed from ordinary two-wire calling devices well known in the telephone art, such, for example, as the one illustrated on pages 16 and 18 of the book entitled "Automatic Telephone Practice," third edition, by Harry E. Hershey. They are so arranged as to send only a definite predetermined series of impulses. That is, when the device 255 is operated, four impulses are sent and, when the device 256 is operated, two impulses are sent.

The device 290 is a releasing device constructed in a manner similar to the devices 255 and 256 and adapted to send seven impulses, when operated. The device 290 is also provided with shunt springs 291 and 292 for controlling certain releasing operations. These springs are similar to those provided in calling devices of a well-known type.

Relays 300 to 315, inclusive, (Fig. 3), comprise the driving circuit at the dispatcher's office. Key K—12 is a start key and is of the usual single-throw, non-locking type.

In Fig. 4, relays 405 to 414, inclusive, comprise the group of selecting relays at the station. There are three relays associated with each apparatus unit that it is desired to control or supervise, the relays 400 to 402, inclusive, being the relays associated with the circuit interrupter C. The circuit interrupter C may be of any usual or well-known type and may perform any desired function at the station, such as connecting two feeder circuits together. Relays 480, 415 and 416 control certain selecting operations, as will appear.

H is an automatic switch of a very simple rotary type having operating and release magnets 490 and 491, respectively, and being provided with a single wiper 492 that is adapted to engage a contact bank of ten contacts. Switches of this type are known as minor switches in the telephone art.

Relays 500 to 517, inclusive, Fig. 5, constitute the driving circuit at the station.

In Fig. 6, relays 600 to 623, inclusive, comprise the chain of counting relays at the station. Relays 624 to 626, inclusive, control certain impulsing and releasing operations, which will be described subsequently.

For the purpose of describing the operation of the apparatus, it will be assumed that the dispatcher desires to close the circuit interrupter C at the station. In order to accomplish this result, the dispatcher will operate the key K—1 into a position opposite from that shown and will then depress the start key K—12 momentarily.

Normally, the selecting apparatus is held inoperative by a holding circuit that extends from ground by way of back contact and armature 321, holding relay 303, conductor 26, back contact and armature 259, conductor 30, armature 442 and its back contact, conductor 476, armature 532 and its back contact, and holding relay 502 to battery. The operation of the holding relay 303 at the office brings about the opening of the locking circuit of the relay 300 at armature 322, the preparation of a starting circuit at armature 323 and the opening of an additional point in the circuit of the relay 306 at armature 324.

At the substation, the operation of the holding relay 502 causes the preparation of a starting circuit at armature 523, the opening of an additional point in the circuit of the relay 500 at armature 524, and the preparation of a circuit for the relay 506 at armature 525.

When the key K—12 is depressed, a circuit is completed that extends from ground by way of the springs of said key, back contact and armature 339, armature 323 and its front contact, armature 320 and its back contact, and relay 301 to battery. The relay 301 is energized to complete a circuit extending from ground by way of back contact and armature 317, armature 319 and its front contact, relay 302 and relay 301 to battery. The relay 302 is short-circuited so long as the key K—12 remains depressed. When this key is released, the short-circuit is removed from the relay 302 and this relay is energized to open the holding circuit, whereby the relays 303 and 502 are deenergized.

Upon being deenergized, the relay 303 completes a circuit for the relay 306 at armature 324, opens an additional point in the starting circuit at armature 323, and at armature 322 prepares a locking circuit for the relay 300. The relay 306 is operated to open a further point in the starting circuit at armature 339, and to prepare one point in the driving circuit at armature 330.

At the station, the relay 502 is deenergized to open one point in the starting circuit at armature 523, to complete a circuit for the relay 500 at armature 524, and to prepare a locking circuit for the relay 503 at armature 525. The relay 500 is operated to complete another point in the driving circuit at armature 519.

The driving circuit is now closed over a path that extends from battery by way of back contact and armature 329, line relay 311, back contact and armature 352, back contact and armature 327, armature 330 and its front contact, trunk conductor 32, front contact and armature 519, armature 521 and its back contact, back contact and armature 538, line relay 513, and armature 551 and its back contact, conductor 499, contact 498 to ground.

The line relay 311 is operated to complete a circuit for the relay 308 at armature 341 and to complete a circuit for the relay 309 at armature 342. The relay 309 is energized to open one point in the locking circuit of the relays 312 and 313 at armature 336, and to complete a circuit for the relay 310 at armature 337 over a path that extends from ground by way of armature 183 and its back contact, conductor 25, armature 343 and its back contact, armature 337 and its front contact, relay 310 and relay 309 to battery. This circuit is not operative to cause the energization of the relay 310 until the short-circuit is removed therefrom by the deenergization of the relay 311. The relay 308 is operated to open one point in the locking circuit of the relay 307 at armature 335, and to establish a locking circuit for itself at armature 334 to ground upon grounded conductor 25.

At the substation, the line relay 513 is operated to complete a circuit for the relay 516 at armature 548, and to complete a circuit for the relay 515 at armature 549. The relay 515 is operated to open one point in the circuit of the relays 511 and 512 at armature 552, and to complete a circuit for the relay 514 at armature 553 over a path that extends from ground by way of armature 686 and its back contact, conductor 475, armature 546 and its back contact, armature 553 and its front contact, relay 514 and relay 515 to battery. This circuit does not operate to energize the relay 514 until the short-circuit is removed from this relay by the deenergization of the relay 513.

The relay 516 is operated to open one point in the locking circuit of the relay 517 at armature 555, to establish a locking circuit for itself at armature 554, to ground upon grounded conductor 475, and to complete a circuit at armature 556 that may be traced from ground by way of said armature and its front contact, conductor 472, armature 682 and its back contact, armature 631 and its back contact, counting relay 600, back contact and armature 680, and back contact and armature 683 to battery.

The counting relay 600 is energized over this circuit and operates to complete a circuit at armature 627 that extends from ground by way of armature 685 and its back contact, armature 627 and its front contact, relay 601, relay 600, back contact and armature 680, and back contact and armature 683 to battery, and to complete a circuit at armature 628 that may be traced from ground by way of said armature and its front contact, armature 633 and its back contact, conductor 460, and relay 501 to battery.

The relay 501 is energized to establish a locking circuit for itself at armature 520, to open the driving circuit including the line relays 311 and 513 at armature 521, to connect the driving circuit to the armature 539 of the relay 509 at the front contact of armature 521, and to complete a circuit for the relay 509 at armature 522. The locking circuit of the relay 501 extends over the front contact and armature 520 to the back contact and armature 542.

The circuit for the relay 509 may be traced from ground by way of back contact and armature 481, conductor 477, armature 522 and its front contact, and relay 509 to battery. The relay 509 is operated to open an additional point in the circuit of the line relay 513 at armature 538, to establish a locking circuit for itself at armature 540, and to prepare a circuit for the line relay 510 at armature 539. It will be obvious that, by the operation of the relays 501 and 509, the circuit of the line relays 311 and 513 is opened. The relay 513 is deenergized to remove the short-circuit from the relay 514. The relay 514 operates to open another point in the circuit of the relay 513.

At the dispatcher's office, the relay 311 is deenergized to remove the short-circuit from the relay 310. The relay 310 is operated to open another point in the original circuit of the relay 309 at armature 338, to open another point in the circuit of the relay 311 at armature 329, and to complete a circuit at armature 340 for the relay 315. The relay 315 is energized to establish a locking circuit for itself at armature 353, to disconnect the line relay 311 from the driving circuit at armature 352 and to connect the driving circuit to the relay 314 at the front contact of this armature.

The driving circuit now extends from ground by way of back contact and armature 347, line relay 314, front contact and armature 352, back contact and armature 327, armature 330 and its front contact, trunk conductor 32, front contact and armature 519, armature 521 and its front contact, armature 539 and its front contact, line relay 510, and armature 545 and its back contact to battery. The line relays 314 and 510 are energized over this circuit.

The line relay 314 is operated to complete a circuit for the relay 307 at armature 350 and to complete a circuit for the relay 312 at armature 351. The relay 312 is operated to open the circuits of the relays 309 and 310 at armature 343 and to prepare a circuit for the relay 313 at armature 344. The relay 310 is deenergized to prepare a circuit for the relay 309 at armature 338, to prepare a circuit for the line relay 311 at armature 329, and to open the original energizing circuit of the relay 315 at armature 340. The relay 309 is deenergized to open another point in the circuit of the relay 310 at armature 337, and to complete a circuit that extends from ground upon grounded conductor 25, back contact and armature 336, armature 344 and its front contact, relay 313, and relay 312 to battery. The relay 313 is short-circuited so long as the relay 314 is energized and, consequently, the relay 313 is not energized.

The relay 307 is operated to prepare a locking circuit for itself at armature 332, to open the locking circuit of the relay 308 at armature 331, and to complete an impulsing circuit at armature 333. The relay 308 is deenergized to complete a locking circuit for the relay 307 to ground upon grounded conductor 25 at armature 335.

The impulsing circuit just mentioned extends from ground by way of back contact and armature 349, armature 333 and its front contact, conductor 22, armature 186 and its back contact, armature 150 and its back contact, counting relay 111, back contact and armature 157, and back contact and armature 184 to battery.

The counting relay 111 is energized over this circuit and operates to complete a circuit at armature 153 that extends from ground by way of armature 182 and its back contact, armature 153 and its front contact, relay 110, relay 111, back contact and armature 157, back contact and armature 184 to battery, and to complete a circuit at armature 154 that extends from ground by way of said armature and its front contact, armature 152 and its back contact, conductor 10, relay 305, and armature 325 and its back contact to battery. The relay 305 is energized to establish a locking circuit for itself at armature 326 to ground upon grounded conductor 25, and to open the driving circuit at armature 327 which includes the line relays 314 and 510.

At the substation, the line relay 510 is operated to complete a circuit for the relay 512 at armature 541. The relay 512 is energized to open the circuit of the relays 514 and 515 at armature 546 and to prepare a circuit for the relay 511 at armature 547. The relay 514 is deenergized to prepare a circuit for the relay 515 at armature 550, and to prepare a circuit for the relay 513 at armature 551. The relay 515 is deenergized to open one point in the circuit of the relay 514 at armature 553, and to complete a circuit that extends from grounded conductor 475 by way of back contact and armature 552, armature 547 and its front contact, relay 511, and relay 512 to battery. This circuit is not effective to energize the relay 511 until the short-circuit is removed from this relay by the deenergization of the relay 510.

When the driving circuit is opened, by the operation of the relay 305, the relay 314 is deenergized, as before mentioned. Upon being deenergized, the relay 314 opens one point in the original energizing circuit for the relay 307 at armature 350, and at armature 351 removes the short-circuit from the relay 313. The relay 313 is immediately operated to open another point in the original circuit for the relay 312 at armature 346, to open another point in the circuit of the line relay 314 at armature 347, to open the locking circuit of the relay 315 at armature 348, and to open the impulsing circuit at armature 349. The relay 315 is deenergized to disconnect the line relay 314 from the driving circuit and to connect the line relay 311 thereto at armature 352.

When the impulsing circuit is opened, the short-circuit is removed from the counting relay 110 and this relay is permitted to operate. Upon operating, the relay 110 opens another point in the original energizing circuit of the relay 111 at armature 150, prepares a circuit for the counting relay 123 at armature 149, removes ground from the conductor 10 at armature 152, completes a circuit at armature 148 that extends from ground by way of back contact and armature 176, armature 148 and its front contact, and relay 126 to battery, and at armature 151 completes a circuit that extends from ground by way of armature 182 and its back contact, armature 181 and its back contact, armature 151 and its front contact, conductor 21, armature 266 and its back contact, and relay 215 to battery.

The relay 215 is energized to complete a circuit that extends from ground by way of armature 185 and its back contact, conductor 23, armature 254 and its front contact, relay 216 and relay 215 to battery, and at armature 265 completes a circuit that extends from ground by way of said armature and its front contact, back contact and armature 257, conductor 27, and relay 304 to battery. The relay 216 is short-circuited so long as the original energizing circuit for the relay 215 is completed. The relay 126 is operated to prepare another point in the circuit for the relay 123.

The relay 304 is energized to open the locking circuit of the relay 305 which is deenergized. The relay 305 retracts the armature 327 to prepare one point in the driving circuit.

At the substation, the line relay 510 is deenergized by the opening of the driving circuit to remove the short-circuit from the relay 511. As a result of this operation, the relay 511 is operated to open the locking circuit of the relays 501 and 509 at armature 542, to complete a circuit for the relay 517 at armature 543, to open an additional point in the original circuit of the relay 512 at armature 544, and to open an additional point in the circuit of the line relay 510 at armature 545.

The relay 517 is energized to open the locking circuit of the relay 516 at armature 557 and to prepare a locking circuit for itself at armature 558. The relay 516 is deenergized to complete a locking circuit for the relay 517 at armature 555 and to open the impulsing circuit at armature 556. By the opening of the impulsing circuit, the short-circuit is removed from the counting relay 601 and this relay is energized.

Upon operating, the relay 601 opens one point in the original energizing circuit of the relay 600 at armature 631, prepares a circuit for the counting relay 612 at armature 630, completes a circuit at armature 629 that extends from ground by way of back contact and armature 658, armature 629 and its front contact and relay 624 to battery, removes ground from conductor 460 at armature 633, and at armature 632 completes a circuit that extends from ground by way of armature 685 and its back contact, armature 656 and its back contact, armature 632 and its front contact, conductor 471, armature 440 and its back contact, and relay 416 to battery. The relay 624 is energized to prepare another point in the circuit of the counting relay 612.

The removal of ground from conductor 460 causes the opening of the original energizing circuit of the relay 501. By the removal of ground from conductor 460, the relay 501 is deenergized to open the original circuit of the relay 509 at armature 522, and to connect the driving circuit to the back contact of armature 538 of relay 509 at armature 521. The relay 509 is deenergized to connect the line relay 513 to the driving circuit and to open another point in the circuit of the relay 510 at armature 539.

The relay 416 is energized to complete a circuit that extends from ground by way of armature 684 and its back contact, conductor 473, armature 443 and its front contact, relay 415, and relay 416 to battery. This circuit is not effective so long as the original circuit for the relay 416 is maintained.

By the deenergization of the relays 501 and 509, the driving circuit is completed. This driving circuit extends from battery by way of back contact and armature 329, line relay 311, back contact and armature 352, back contact and armature 327, armature 330 and its front contact, conductor 32, front contact and armature 519, armature 521 and its back contact, back contact and armature 538, line relay 513, and armature 551 and its back contact and contacts 498 to ground. The line relays 311 and 513 are energized over this circuit.

The line relay 311 is operated to complete a circuit for the relay 309 at armature 342, and to complete a circuit for the relay 308 at armature 341. The relay 309 is energized to open the circuits of the relays 312 and 313 at armature 336, and to prepare a circuit for the relay 310 at armature 337. The relay 313 is deenergized to prepare a circuit for the relay 312 at armature 346, to prepare a circuit for the line relay 314 at armature 347, to close one point in the locking circuit of the relay 315 at armature 348, and to close one point in the impulsing circuit at armature 349. The relay 312 is deenergized to open one point in the circuit of the relay 313 at armature 344, and to complete the circuit of the relay 310 at armature 343. The relay 310 is not energized so long as the original circuit for the relay 309 is maintained. The relay 308 is operated to open the locking circuit of the relay 307 at armature 335, and to prepare a locking circuit for itself at armature 334. The relay 307 is deenergized to complete the locking circuit of the relay 308 and to open another point in the impulsing circuit at armature 333.

At the substation, the relay 513 is energized to complete a circuit for the relay 516 at armature 548, and to complete a circuit for the relay 515 at armature 549. The relay 515 is operated to open the circuit of the relays 511 and 512 and to prepare a circuit for the relay 514. The relay 511 is deenergized to prepare a circuit for the relay 512 at armature 544, to prepare a circuit for the line relay 510 at armature 545, to open the original energizing circuit of the relay 517 at armature 543, and to prepare a locking circuit for the relays 501 and 509 at armature 542.

The relay 516 is energized to prepare a locking circuit for itself at armature 554, to open the locking circuit of the relay 517 at armature 555, and to complete an impulsing circuit at armature 556. The relay 517 is deenergized to close the locking circuit of the relay 516.

The impulsing circuit just mentioned extends from ground by way of armature 556 and its front contact, conductor 472, armature 682 and its front contact, front contact and armature 630, armature 660 and its back contact, counting relay 612, back contact and armature 680 and back contact and armature 683 to battery.

The counting relay 612 is energized over this circuit and operates to open the circuit of relay 416 at armature 656, to complete a circuit at the front contact of this armature that extends from ground by way of armature 685 and its back contact, armature 656 and its front contact, relay 613, relay 612, back contact and armature 680, and back contact and armature 683 to battery, and at armature 655 completes a circuit that extends from ground by way of said armature and its front contact, armature 657 and its back contact, conductor 460 and relay 501 to battery. The circuit for the relay 613 is not effective to energize this relay until the original circuit of the relay 612 is opened. The relay 501 is energized to open the driving circuit including the line relays 311 and 513 at armature 521, to complete a locking circuit for itself at armature 520, and to complete a circuit for the relay 509 at armature 522. The relay 509 is energized to establish a locking circuit for itself at armature 540 and to prepare the driving circuit by connecting the relay 510 thereto at armature 539.

As before mentioned, the operation of the relay 612 opens the original circuit for the relay 416. This operation causes the removal of the short-circuit from the relay 415. This relay is operated to prepare signaling and control circuits at armatures 441 and 442, respectively.

By the opening of the driving circuit, the line relay 513 is deenergized to remove the short-circuit from the relay 514. The relay 514 is energized to open another point in the circuit of the relay 515 and to open another point in the circuit of the relay 513.

At the dispatcher's office, when the driving circuit is opened, the relay 311 is deenergized to remove the short-circuit from the relay 310. The relay 310 operates to open one point in the original circuit for the relay 309 at armature 338, to open another point in the circuit of the line relay 311 at armature 329, and to complete a circuit for the relay 315 at armature 353. The relay 315 is energized to connect the line relay 314 to the driving circuit at armature 352, and to establish a locking circuit for itself at armature 353. The driving circuit, including the line relays 314 and 510 in series, is now completed.

The line relay 314 is energized to complete a circuit for the relay 312 and for the relay 307. The relay 312 is operated to open the circuit of the relays 309 and 310 at armature 343 and to prepare a circuit for the relay 313. The relay 310 is deenergized to prepare circuits for the relays 309 and 311 at armatures 338 and 339, and to open the original energizing circuit of the relay 315 at armature 340. The relay 309 is deenergized to complete a circuit for the relay 313. This latter operation is ineffective until the short-circuit is removed from the relay 313 by the deenergization of the relay 314.

The relay 307 is operated to prepare a locking circuit for itself at armature 332, to open the locking circuit of the relay 308 at armature 331, and to complete an impulsing circuit at armature 333. The relay 308 is deenergized to complete the locking circuit of the relay 307.

The impulsing circuit extends from ground by way of back contact and armature 349, armature 333 and its front contact, conductor 22, armature 186 and its front contact, front contact and armature 149, armature 178 and its back contact, counting relay 123, back contact and armature 157, and back contact and armature 184 to battery.

The counting relay 123 is energized over this circuit and operates to open the circuit of the relay 215 at armature 181, to complete a circuit for the relay 122 at the front contact of this armature over a path that may be traced from ground by way of armature 182 and its back contact, armature 181 and its front contact, relay 122, relay 123, back contact and armature 157, and back contact and armature 184 to battery, and to prepare a circuit at armature 180 that extends from ground by way of said armature and its front contact, armature 175 and its back contact, conductor 10, relay 305 to armature 325. The counting relay 122 is not operated over this circuit by reason of the fact that it is shunted so long as the original circuit of the relay 123 is maintained.

By the removal of ground from conductor 21, the original circuit for the relay 215 is opened with the consequence that the short-circuit is removed from the relay 216. The relay 216, upon operating, opens an additional point in the original circuit of the relay 215 at armature 256, opens the circuit of the relay 304 at armature 257, and connects the signaling conductors 30 and 31, at armatures 258 and 259, to the contacts of the selecting relays.

The relay 304 is deenergized to complete a circuit for the relay 305, previously traced. The relay 305 is energized to establish a locking circuit for itself at armature 326 and to open the driving circuit, including the line relays 314 and 510, at armature 327. The line relay 314 is immediately deenergized to open the original energizing circuit of the relay 307 and to remove the short-circuit from the relay 313. The relay 313 is energized to open another point in the original circuit of the relay 312 at armature 346, to open another point in the circuit of the relay 314 at armature 347, to open the locking circuit of the relay 315 at armature 348, and to remove ground from the impulsing circuit at armature 349. The relay 315 is deenergized to connect the line relay 311 to the driving circuit.

By the opening of the impulsing circuit, the short-circuit is removed from the relay 122 and this relay is permitted to operate. Upon being energized, the relay 122 removes ground from conductor 10 at armature 175, opens the circuit of the relay 126 at armature 176, prepares a circuit for the counting relay 109 at armature 177, and at armature 179 completes a circuit that extends from ground by way of armature 182 and its back contact, armature 146 and its back contact, armature 179 and its front contact, conductor 20, and selecting relay 214 to battery. The relay 126 is deenergized to prepare a point in the circuit of the counting relay 109 at armature 186 and its back contact.

The removal of ground from conductor 10 causes the opening of the original energizing circuit of the relay 305. This relay is not deenergized, however, by reason of the fact that its locking circuit remains closed.

The selecting relay 214 is operated to complete a circuit for the signaling device 241 at spring 250, to prepare a signaling circuit at spring 251, to prepare a control circuit at spring 252, and to prepare a point in the circuit of the relay 304 at spring 253. The operation of the signaling device 241 apprises the dispatcher of the selecting position of the selecting relays. The circuit of the relay 304 is not completed by reason of the fact that the key K—1 is in a position opposite to that shown, and ground is removed from the conductor extending to the springs of the key K—11.

At the substation, the line relay 510 is deenergized, when the driving circuit is opened, to remove the short-circuit from the relay 511. The relay 511 is operated to open another point in the original circuit of the relay 512 at armature 544, to open a second point in the circuit of the line relay 510 at armature 545, to complete a circuit for the relay 517 at armature 543, and to open the locking circuits of the relays 501 and 509 at armature 542.

The relay 517 is energized to open the locking circuit of the relay 516 at armature 557, and to prepare a locking circuit for itself at armature 558. The relay 516 is deenergized to complete the locking circuit of the relay 517 at armature 555 and to open the impulsing circuit at armature 556. By the latter operation, the short-circuit is removed from the counting relay 613 and this relay is permitted to operate.

Upon being energized, the relay 613 removes ground from conductor 460 at armature 657, opens the circuit of the relay 624 at armature 658, prepares a circuit for the counting relay 602 at armature 659, opens another point in the original circuit of the relay 612 at armature 660, and at armature 661 completes a circuit that extends from ground by way of armature 685 and its back contact, armature 634 and its back contact, armature 661 and its front contact, conductor 470, and selecting relay 405 to battery. The selecting relay 405 is energized to prepare a signaling circuit at spring 426, to prepare a control circuit at spring 425, and to complete a circuit at spring 427 for the relay 480. The relay 624 is deenergized to prepare another point in the circuit of the relay 603.

The removal of ground from conductor 460 brings about the deenergization of the relay 501. The relay 501 operates to prepare a circuit for the line relay 513 and to open the circuit of the relay 509. The relay 509 is deenergized to open another point in the circuit of the line relay 510 and to prepare another point in the circuit of the line relay 513. The relay 480 is energized to open another point in the circuit of the relay 509.

The operation of the driving circuit does not occur by reason of the fact that the relay 305 is locked energized. A signaling circuit is now completed that extends from battery by way of front contact and armature 420, working contact of spring 426 and said spring, front contact and armature 441, conductor 31, armature 258 and its front contact, spring 251 and its working contact, armature 230 and its back contact, and relay 203 to battery. Inasmuch as the proper signaling device 225 is operated to indicate that the circuit interrupter is in its open position, there is no change in the signaling devices.

It will be seen that, when the key K—1 is operated, a circuit is completed that extends from ground by way of springs of control device 255, working contact of spring 270 and said spring, front contact and armature 222, contact 252, the front contact and armature 259, control conductor 30, armature 442 and its front contact, spring 425 and its working contact, and relay 430 to battery.

The relay 430 is energized to complete a circuit for the slow-releasing relay 431. The relay 431, upon operating, prepares a circuit for the stepping magnet 490 at armature 435, and at armature 436 prepares a circuit for the slow-releasing relay 432. When the control device 255 is operated, four interruptions are produced in this circuit. Upon the first deenergization of the relay 430, an impulse of current is sent over a path that extends from ground by way of back contact and armature 434, front contact and armature 436, and slow-releasing relay 432 to battery. In addition, a current impulse is sent over a path extending from ground by way of armature 433 and its back contact, armature 435 and its front contact, and stepping magnet 490 to battery.

The stepping magnet 490 is energized to move the wiper 492 one step. The slow-releasing relay 432 is energized to disconnect ground from wiper 492 at armature 437. When the relay 430 is energized, the circuit of the slow-releasing relay 432, as well as the circuit of the magnet 490 are opened. The stepping magnet 490 is deenergized to position its pawl. The slow-releasing relay 432 is not deenergized between impulses.

Upon the first off-normal step of the wiper 492, the off-normal spring 497 is forced into engagement with its working contact and the off-normal spring 498 is forced from engagement with its resting contact. The former operation prepares a circuit for the release magnet 491, while the latter operation removes ground from one terminal of the line relay 513. The removal of this ground prevents the driving circuit from being closed until the rotary switch H is released.

As four interruptions are produced in the circuit of the relay 430, the wiper 492 is advanced into engagement with the bank contact 494 by the operation of the stepping magnet 490. During this operation, the slow-releasing relay 432 is maintained energized.

A short interval of time after the operation of the control device 255, the circuit of the relay 430 being permanently closed, the relay 432 is deenergized. As a result of this operation, a circuit is completed that may be traced from ground by way of armature 437 and its back contact, wiper 492, bank contact 494, spring 428 and its working contact, and relay 402 to battery. The relay 402 is operated over this circuit and completes the circuit of the closing coil 403 of the circuit interrupter C. The circuit interrupter C is immediately operated.

The action of a circuit interrupter at the sub-station causes the opening of the circuit of the slow-releasing relay 400 at the pallet switch 423 and the closure of a circuit, before the slow-releasing relay is deenergized, that extends from ground by way of auxiliary switch 423, armature 417 and its front contact, conductor 478, front contact and armature 580, armature 518 and its front contact, armature 537 and its back contact, and relay 507 to battery.

The relay 507 is energized to prepare a point in the circuit of the relay 506 at armature 534, and to complete a circuit that extends from ground by way of back contact and armature 533, armature 535 and its front contact, relay 508 and relay 507 to battery. The relay 508 is short-circuited until the circuit of the relay 507 is opened. When the slow-releasing relay 400 is finally deenergized, the short-circuit is removed from the relay 508 and this relay is operated to place ground upon conductor 478 at armature 536 and thereby prepare a starting circuit for reoperating the relay chain as more fully described hereafter.

The deenergization of the slow-releasing relay 400 also connects ground to the previously traced signaling circuit that includes the relay 203 at the office. Upon operating, the relay 203 attracts its armature 229, whereby the armatures 226, 227 and 228 of the relay 202 are permitted to resume their normal position. By the operation of the armature 226, the signaling device 225 is extinguished and the signaling lamp 224 is lighted. The operation of the armature 227 completes a circuit for the relay 204, while the armature 228 opens one point in the circuit of the relay 200. By the change in signaling devices, the dispatcher is informed that the desired action at the substation has taken place.

The slow-releasing relay 204 is energized to open the circuit of the signaling relay 203 at armature 230, and to complete a circuit at armature 231 that extends from battery by way of said armature and its front contact, relay 201, and working contact of spring 220 and said spring to ground. The relay 201 is energized over this circuit and operates its armature 223 to permit the release of the armatures 221 and 222 of the relay 200. By the operation of the armature 222, the control circuit, including the relay 430, is opened, while, by the operation of the armature 221, a circuit is completed that extends from ground by way of spring 220 and its working contact, back contact and armature 221, springs of key K—11, working contact of spring 253 and said spring, conductor 27, and relay 304 to battery. The relay 304 is energized to open the locking circuit of the relay 305 at armature 325, and the relay 305 is deenergized to prepare the driving circuit.

When the circuit of the relay 430 is opened, as previously described, this relay is deenergized to open the circuit of the slow-releasing relay 431 and to send a momentary current impulse to the relay 432. The relay 432 is energized to open the circuit of the relay 402 at armature 437. The slow-releasing relay 431 is deenergized, after an interval of time, to open the circuit of the slow-releasing relay 432, and to complete a circuit for the release magnet 491 that extends from ground by way of armature 433 and its back contact, armature 435 and its back contact, working contact of off-normal spring 497 and said spring, and release magnet 491 to battery. Before this release circuit is completed, a circuit is completed for the stepping magnet 490. This magnet operates to advance the wiper 492 one step. This operation is without function at the present time.

The release magnet 491 operates to restore the wiper 492 to normal, whereupon the release circuit is opened by the operation of the off-normal spring 497 and ground is placed upon the conductor 499 by the operation of the off-normal spring 498. The latter operation connects ground to one terminal of the line relay 513, which completes the driving circuit.

The driving circuit now continues to function in the same manner as before. The line relays 311 and 314 are connected to this circuit alternately to cause the operation of the counting relays in the following sequence, 109, 108, 121, 120, 107, 106, 119, 118, 105, 104, 117, 116, 103, 102, 115, 114, 101, 100, 113 and 112. By the operation of the counting relays, the selecting relays 213, 212, 211, 210, 209, 208, 207, 206 and 205 are operated in the sequence mentioned, each relay being released upon the energization of the next succeeding counting relay. That is, the selecting relay 214 is released by the energization of the counting relay 109. The selecting relays, in operating, prepare certain circuits for connecting the various keys, such as K—1, and signaling devices, such as 224 and 225, to the driving circuit. Inasmuch as it has been assumed that the dispatcher desires only to operate the circuit interrupter C, no further control circuits will be completed and the action of the driving circuit to cause the operation of the relays just mentioned will be continued.

At the substation, the line relays 513 and 510 are alternately connected to the driving circuit and operated to bring about the energization of the counting relays in the following sequence, 602, 603, 614, 615, 604, 605, 616, 617, 606, 607, 618, 619, 608, 609, 620, 621, 610, 611, 622 and 623. The operation of the counting relays causes the energization of the selecting relays in the following sequence, 406, 407, 408, 409, 410, 411, 412, 413, and 414.

The selecting relays are deenergized in the same sequence by the operation of the next succeeding counting relay. That is, the selecting relay 405 is deenergized by the operation of the counting relay 602. The operation of the selecting relays connects various relays, such as 400 to 402, inclusive, to the signaling and control circuits so that the proper signals are transmitted to the dispatcher's office to apprise the dispatcher of the position of the various apparatus units.

It will be obvious that, in order to insure proper action of the driving circuit, it is necessary to alternately connect the line relays 311 and 314 and the line relays 513 and 510 to the driving circuit at the dispatcher's office and substation, respectively. Otherwise, there is no driving circuit completed. The alternate connection of the line relays and the action of the driving circuit is controlled indirectly by the energization of the counting and selecting relays, it being necessary that the line relays 311 and 314 be operated to bring about the energization of a single counting relay, such as counting relay 111. In the same manner, it is necessary that the counting relays 513 and 510 be operated to bring about the operation of the counting relay 600 at the substation.

The operation of the counting relays, such as 111 and 600, causes the operation of the relays 305 and 460 whereby the action of the driving circuit is interrupted. This operation brings about the simultaneous energization of whatever selecting relays are selected. The operation of these selecting relays, in turn, controls the operation of the relays 304 and 480 to close the driving circuit. By this interrelation of circuits, the synchronous action of the relay selecting apparatus is insured. This is true even though the control or driving circuit be subjected to inductive interference because, unless the line relays are properly connected to the driving circuit, there will be no selecting action.

When the counting relay 113 is operated by the energization of the line relay 314, the circuit of the selecting relay 205 is opened and a circuit is completed for the relay 112. The circuit for the relay 112 is not effective until the circuit of the relay 113 is opened. The relay 205 is deenergized to open certain signaling circuits and to remove ground from conductor 27, whereby the relay 304 is deenergized to complete a circuit for the relay 305. The relay 305 is operated to open the circuit of the relay 314. This relay is deenergized to cause the operation of the relay 313. The relay 313 is operated to open the impulsing circuit, whereby the short-circuit is removed from the relay 112. Upon operating, the relay 112 opens the original energizing circuit of the relay 305 at armature 155, opens the circuit of the relay 125 at armature 156, and removes the short-circuit from the relay 125 at armature 157.

The relay 125 is now energized in series with all the counting relays. This relay operates to remove ground from conductor 23 at armature 185, and to complete a circuit for the slow-releasing relay 124 at the front contact of this armature. By the removal of ground from conductor 23, the circuit of the relays 215 and 216 is opened and these relays are deenergized. The relay 215 is deenergized to open another point in the circuit of the relay 216 and to open another point in the circuit of the relay 304. The relay 216 is deenergized to prepare a circuit for the relay 215 at armature 256, to prepare a point in the circuit of the relay 304 at armature 257, to open one point in a signaling circuit at armature 258, to open the control circuit at armature 259, and to prepare a holding circuit at the back contact of this armature.

The slow-releasing relay 124 is energized to remove ground from conductor 25 at armature 183 and to place ground upon the conductor 24 at the front contact of this armature. In addition, the operation of the relay 124 serves to open the circuits of all the counting relays 100 to 123, inclusive, and also the circuit of the relay 125 at armature 182. The relay 125 is deenergized to open the circuit of the slow-releasing relay 124, although this relay remains operated for a short interval of time. The counting relays are deenergized to restore certain circuits to normal.

The removal of ground from conductor 25 brings about the deenergization of the relay 305 and the relays 312 and 313. The relay 305 is deenergized to prepare one point in the driving circuit. The relays 312 and 313 are deenergized to restore certain circuits to normal. By the connection of ground to conductor 24, a circuit is completed for the relay 300. The relay 300 is energized to establish a locking circuit for itself at armature 316, to open the circuits of the relays 301 and 302 at armature 317, and to open the circuit of the relay 306 at armature 318. The relay 301 is deenergized to open one point in the circuit of the relay 302. The relay 302 is deenergized to prepare a point in the holding circuit at armature 321. The relay 306 is deenergized to open the driving circuit at armature 330 and to prepare a point in the starting circuit at armature 329. In this manner, the apparatus at the dispatcher's office is restored to normal.

At the substation, the counting relay 622 is energized by the operation of the line relay 513. The relay 622 is operated to bring about the energization of the relay 501 and the opening of the circuit of the selecting relay 414. The relay 414 is deenergized to open the circuit of the relay 480. The relay 480 is deenergized to prepare a circuit for the relay 509. The relay 501 is energized to complete a circuit for the relay 509. The operations of the relays 501 and 502 connect the line relay 510 to the driving circuit so that this relay is energized in series with the line relay 314 at the dispatcher's office.

When the driving circuit is opened by the operation of the relay 305 in the manner described, the relay 511 is permitted to energize. As a result of this operation, the relay 516 is deenergized and the short-circuit is removed from the counting relay 623. Upon operating, the counting relay 623 opens the original energizing circuit of the relay 501 at armature 678, opens the circuit of the relay 624 at armature 679, and removes the short-circuit from the relay 625 at armature 680. The relay 625 is operated to remove ground from the conductor 473 at armature 684 and to complete a circuit for the relay 626 at the front contact of this armature.

By the removal of ground from conductor 473, the circuits of the relays 415 and 416 are opened. The relay 416 is deenergized to open one point in the circuit of the relay 415. The relay 415 retracts its armatures to prepare one point in the circuit of the relay 416 at armature 440, to open one point in the signaling circuit at armature 441, to open one point in the control circuit at armature 442, and to prepare a point in the holding circuit at the back contact of this armature.

The slow-releasing relay 626 is energized to open the circuits of all the counting relays 600 to 623, inclusive, and also to open the circuit of the relay 625. Various counting relays are deenergized to restore certain circuits to normal. The relay 625 is deenergized to open the circuit of the relay 626, which remains energized for a short interval of time. The removal of ground from conductor 475 brings about the deenergization of the relays 511 and 512. These relays retract their armatures to restore certain circuits to normal.

By the connection of ground to conductor 472, a circuit is completed for the relay 503. The relay 503 is operated to open certain points in the circuits of the relays 504 and 505 at armature 528, to open the circuit of the relay 500 at armature 526, and to establish a locking circuit for itself at armature 527. The relay 504 is deenergized to open one point in the circuit of the relay 505 at armature 530 and to open one point in the circuit of the relay 506 at armature 531. The relay 505 is deenergized to prepare a circuit for the relay 504 at armature 509 and to prepare a holding circuit at armature 532. The holding circuit is now completed over a path that extends from ground by way of back contact and armature 321, holding relay 303, conductor 26, back contact and armature 259, conductor 30, armature 442 and its back contact, conductor 476, armature 532 and its back contact, and holding relay 502 to battery.

The holding relay 303, at the dispatcher's office, is energized to open the locking circuit of the relay 300 and to prepare a circuit for the starting relay 301. The relay 300 is deenergized to prepare a circuit for the relay 302 at armature 317 and to prepare a circuit for the relay 306 at armature 318.

At the substation, the holding relay 502 is energized to open the locking circuit of the relay 503 at armature 525, and to prepare a point in the circuit of the relay 506 at the front contact of this armature. The relay 503 is deenergized to prepare a circuit for the relay 500 at armature 526 and to prepare a circuit for the relay 505 at armature 528. In this manner, the apparatus at the substation is restored to normal.

When the relay 502 is deenergized, there is a starting circuit completed that extends from ground upon grounded conductor 478 by way of front contact and armature 523, armature 518 and its back contact, armature 531 and its back contact, and relay 504 to battery. The relay 504 is energized to complete a circuit for the relay 505 at armature 529, and to complete a circuit, at armature 530, that extends from ground by way of armature 525 and its front contact, front contact and armature 530, relay 506, and front contact and armature 534 to battery. The relay 505 is not energized so long as the original circuit for the relay 504 is maintained.

The relay 506 is operated to open the circuits of the relays 507 and 508. The relay 508 is deenergized to open the circuit of the relay 504. The relay 505 is immediately energized in series with the relay 504. By the operation of the relay 505, the holding circuit is opened and the holding relays 303 and 502 at the dispatcher's office and substation, respectively, are deenergized. The results of the deenergization of these relays are the same as those previously described and function to bring about the selecting operation of the relay apparatus. The purpose of this reoperation is to positively check all the supervisory indications of the dispatcher.

In the event that an apparatus unit at the substation is operated automatically by the action of devices responsive to circuit conditions (not shown), the action of the selecting apparatus is immediately initiated. In order to describe this action, it will be assumed that the circuit interrupter is closed and that it is opened by the action of automatic devices or manually by an operator at the substation. When the circuit interrupter is opened, there is a circuit completed for the slow-to-operate relay 400 by the auxiliary switch 423. Before the slow-to-operate relay 400 is energized, a circuit is completed that extends from ground by way of auxiliary switch 423, armature 418 and its back contact, conductor 478, front contact and armature 523, armature 518 and its back contact, armature 531 and its back contact, and relay 504 to battery. The relay 504 is energized to complete a circuit for the relay 505. When the slow-to-operate relay 400 is finally energized, ground is removed from the conductor 478 with the result that the short-circuit of the relay 505 is removed and this relay is operated to open the holding circuit. By this operation, the selecting action is initiated.

Under certain conditions, it will be obvious that the dispatcher may find it desirable to connect with a certain apparatus unit and remain in connection therewith while he observes its operation responsive to control. To accomplish this relay, the dispatcher is provided with a number of keys, such as K—2 to K—11, inclusive. To describe this operation, it will be assumed that the dispatcher desires to observe the operation of the circuit interrupter C. In order to accomplish this result, the dispatcher will operate the key K—11 and will then operate the start key K—12.

The operation of the selecting apparatus proceeds as before and the selecting relays 214 and 405 at the dispatcher's office and station, respectively, are energized by the action of the driving circuit. Under these conditions, the relay 305 is locked energized and the circuit of the relay 304, which opens the locking circuit of the relay 305, is opened by the operation of the key K—11. Consequently, until this key is restored to normal, the apparatus will remain in this position by reason of the driving circuit being opened. Therefore, the dispatcher is able to operate the circuit interrupter C as often as he desires and observe its action by the operation of the supervisory devices 224 and 225.

When the dispatcher desires to have the selecting apparatus continue its selecting action, he will restore the key K—11 to normal, whereby the circuit of the relay 304 is permitted to be closed. As a result of this action, the relay 305 is deenergized to complete the driving circuit. The operation of the selecting apparatus proceeds in the same manner as before.

If the dispatcher should desire to trip any circuit breaker, as for example, the circuit breaker C, he will operate his start key, with the result that the selecting apparatus will operate at the first and second stations in synchronism in the manner which has been described in detail above. Simultaneously with the operation of the start key, the dispatcher will operate the stop key associated with the apparatus unit which he desires to operate. When the apparatus unit has been reached, the dispatcher will operate the dial 256, transmitting two impulses over the signaling line 30 in the manner which has been described in detail in connection with the dial transmitter 255. The key 219, in this case, will be in the position shown and the relay 211 will have been deenergized as a result of the circuit breaker having previously been closed. A circuit will thereupon be completed from ground over the contacts of the dial key 256, contacts 217, 222 and 252, front contact and armature 259 over the control line 30, armature 442 and its front contact, the second contact of the selecting relay 405 through the winding of the relay 430 to battery and ground. The dial 492 of the selector switch 8 will now be stepped around in a manner which has been described in connection with the closing operation until the wiper 492 engages the second contact. At the end of the impulse period after the wiper 492 is in engagement with the second contact, a circuit will be completed from ground over armature 437 and its back contact, the wiper 492 and the second contact of the switch H and the contact of the selecting relay 405 and through the winding of relay 401 to battery and ground. The energization of relay 401 completes an obvious energizing circuit for the relay 404 which functions thereupon to trip the circuit breaker.

The dispatcher is also provided with means for releasing the selective equipment when he so desires. In order to accomplish this result, the dispatcher will operate the key K—15 and the release device 290. By the operation of the key K—15, a circuit is completed for the relay 430 at the substation. The relay 430 is energized to complete a circuit for the relay 431 at armature 433. The relay 431 is energized to open one point in the release circuit at armature 435, and to prepare a circuit for the stepping magnet 490 at the front contact of this armature. Another result of the operation of the relay 431 is that a circuit is prepared for the slow-releasing relay 432 at armature 436.

When the release device is first operated, that is, moved from its normal position, the shunt spring 292 is forced into engagement with its working contact, and, as a result of this operation, ground is placed upon the conductor 28 to complete a circuit for the relay 113. The relay 113 is operated to complete a circuit for the relay 112 at armature 160, and to complete a circuit for the relay 130

305 at armature 159. The relay 112 is not operated until the circuit of the relay 113 is opened.

The restoration of the release device 290 to normal produces seven interruptions in the circuit of the relay 430 at the substation and also removes ground from the conductor 28. As a result of the latter operation, the short-circuit is removed from the relay 112 and this relay is energized in series with the relay 113. The relay 112 is energized to open the original circuit of the relay 305 at armature 155, to open one point in the circuit of the relay 126 at armature 156, and to remove the short-circuit from the relay 125 at armature 157. The relay 125 is energized to complete a circuit for the slow-releasing relay 124 at armature 185 and to remove ground from conductor 23 at the back contact of this armature. The removal of ground from conductor 23 opens the circuits of the relays 215 and 216. These relays are deenergized to restore certain circuits to normal.

By the operation of the slow-releasing relay 124, the selecting apparatus at the dispatcher's office is restored to normal. The seven interruptions produced in the circuit of the relay 430 by the operation of the release device 292, previously described, cause the stepping magnet 490 of the switch H to advance the wiper 492 into engagement with the bank contact 495. A short interval of time after the termination of this series of interruptions, the slow-releasing relay 432 is deenergized to complete a circuit extending from ground by way of armature 437 and its back contact, wiper 492, bank contact 495, conductor 459, relay 622, back contact and armature 680, and back contact and armature 683 to battery. The relay 622 is energized to complete a circuit for the relay 623.

When the dispatcher restores the key K—15 to normal, the circuit of the relay 430 is opened and this relay is deenergized to bring about the release of the rotary switch H in the same manner as before described. By the energization of the slow-releasing relay 432, previous to this release, the circuit of the relay 622 is opened and the relay 623 is permitted to operate. The relay 623 operates to remove the short-circuit from the relay 625 and this relay is energized to complete a circuit for the slow-releasing relay 626. These operations proceed in the same manner as before described to bring about the release of the apparatus at the substation.

Our invention is not limited to the particular arrangement of the apparatus described but may be variously modified without departing from the spirit and scope thereof, as set forth in the appended claims.

We claim as our invention:

1. In a signaling system, the combination with a dispatcher's office, a station, a plurality of apparatus units in said office and station, relay selecting apparatus in said office and station, of means including a driving circuit for operating said relay selecting apparatus to select predetermined apparatus units, an automatic switching device at said station comprising a wiper and cooperating bank contacts, and means for moving said wiper into engagement with a predetermined one of said bank contacts and means responsive to engagement of said wiper with said bank contact for bringing about the release of said selecting apparatus at said station.

2. In a signaling system, the combination with a dispatcher's office, a station, a plurality of apparatus units in said office and station, relay selecting apparatus in said office and station, of a driving circuit for operating said relay selecting apparatus to select predetermined apparatus units, an automatic switching device at said station comprising a wiper and cooperating bank contacts, and means controlled from said office for moving said wiper into engagement with a predetermined one of said bank contacts and means responsive thereto for bringing about the release of said selecting apparatus at said station.

3. In a signaling system, the combination with a dispatcher's office, a station, a plurality of apparatus units in said office and station, relay selecting apparatus in said office and station, of a driving circuit for operating said relay selecting apparatus to select predetermined apparatus units, an impulse sending device at said office, an automatic switching device at said station, comprising a wiper and cooperating bank contacts for said device, and means controlled by said impulse sending device for moving said wiper into engagement with a predetermined one of said bank contacts and means responsive thereto for bringing about the release of said selecting apparatus at said station.

4. In a signaling system, the combination with a dispatcher's office, a station, a group of relays at said office, a group of relays at said station, and a plurality of apparatus units at said station, a driving circuit for operating the relays in said groups in a predetermined sequence to select said apparatus units in a predetermined sequence, means for interrupting the action of said driving circuit when any predetermined apparatus unit is selected, an automatic switch at said station having a wiper and cooperating bank contacts, and means for operating said switch into engagement with a predetermined one of said bank contacts to operate said unit.

5. In a signaling system, the combination with a dispatcher's office, a station, a group of relays at said office, a group of relays at said station, and a plurality of apparatus units at said station, a driving circuit for operating the relays in said groups in a predetermined sequence to select said apparatus units in a predetermined sequence, means for interrupting the action of said driving circuit when any predetermined apparatus unit is selected, an automatic switch at said station having a wiper and cooperating bank contacts, and means for operating said switch in response to a predetermined code of impulse into engagement with one of said bank contacts to operate said unit.

In testimony whereof, we have hereunto subscribed our names this 24th day of November, 1924.

THOMAS U. WHITE.
JOHN E. GARDNER.